(12) United States Patent
Nakajima

(10) Patent No.: US 9,145,244 B2
(45) Date of Patent: Sep. 29, 2015

(54) BAND FASTENING TOOL

(75) Inventor: Takatoshi Nakajima, Tokyo (JP)

(73) Assignee: TOKO KAGAKU CO., LTD., Tokyo (JP)

( * ) Notice: Subject to any disclaimer, the term of this patent is extended or adjusted under 35 U.S.C. 154(b) by 0 days.

(21) Appl. No.: 14/380,858

(22) PCT Filed: Mar. 27, 2012

(86) PCT No.: PCT/JP2012/057902
§ 371 (c)(1),
(2), (4) Date: Aug. 25, 2014

(87) PCT Pub. No.: WO2013/145118
PCT Pub. Date: Oct. 3, 2013

(65) Prior Publication Data
US 2015/0013555 A1    Jan. 15, 2015

(51) Int. Cl.
| | |
|---|---|
| *B65B 67/00* | (2006.01) |
| *F16B 2/08* | (2006.01) |
| *A44B 11/02* | (2006.01) |
| *B65D 63/16* | (2006.01) |
| *A44B 11/06* | (2006.01) |
| *A44B 11/12* | (2006.01) |

(52) U.S. Cl.
CPC . *B65D 63/16* (2013.01); *F16B 2/08* (2013.01); *A44B 11/065* (2013.01); *A44B 11/125* (2013.01)

(58) Field of Classification Search
CPC ........... B65B 13/22; F16B 2/08; A44B 11/02; A44B 11/04; A44B 11/12; A44B 11/065; B65D 63/16; F16G 11/00; A62B 18/02; A62B 18/08

USPC ........... 100/29, 32, 33 R, 211, 212, 278, 279; 24/170; 269/131, 132
See application file for complete search history.

(56) References Cited

U.S. PATENT DOCUMENTS

| | | | | |
|---|---|---|---|---|
| 3,011,237 | A | * | 12/1961 | Prete, Jr. .......................... 24/170 |
| 5,181,280 | A | * | 1/1993 | Zachry, Jr. ........................ 2/452 |
| 6,295,700 | B1 | * | 10/2001 | Plzak .......................... 24/134 R |
| 2001/0054219 | A1 | * | 12/2001 | Settelmayer et al. ........... 24/170 |
| 2008/0010786 | A1 | * | 1/2008 | Huang ............................ 24/170 |

FOREIGN PATENT DOCUMENTS

| | | |
|---|---|---|
| JP | 59-057370 A | 4/1984 |
| JP | 01-158204 A | 6/1989 |
| JP | 04-231974 A | 8/1992 |

(Continued)

OTHER PUBLICATIONS

International Search Report for PCT/JP2012/057902 (2 pgs.).

*Primary Examiner* — Jimmy T Nguyen
(74) *Attorney, Agent, or Firm* — Flynn, Thiel, Boutell & Tanis, P.C.

(57) ABSTRACT

A band fastening tool in which a bearing of a main body is provided with a protrusion, the rotary shaft is provided with a cut-out engaged with the protrusion, a winding shaft of a rotary lever is formed into a cam shape having a base shaft portion and a projecting portion, the rotary lever is provided with an insertion hole wall in which a band insertion hole is formed, a bottom plate of the main body has an engagement claw, an upper wall of the rotary lever is provided with a claw receiver engaged with the engagement claw, as the rotary lever is rotated to a closing position, winding of the band along the base shaft portion and fixing of the band between the bottom plate of the main body and the projecting portion of the winding shaft are promoted.

5 Claims, 8 Drawing Sheets

(56) References Cited

FOREIGN PATENT DOCUMENTS

| JP | 10-009222 A | 1/1998 |
| JP | 2007-296313 A | 11/2007 |
| JP | 2007-298084 A | 11/2007 |
| JP | 2011-021658 A | 2/2011 |

* cited by examiner

FRONT ←

FRONT ←

BAND FASTENING TOOL

This is the National Stage of International Application No. PCT/JP2012/057902, filed Mar. 27, 2012.

TECHNICAL FIELD

The present invention relates to a band fastening tool and relates particularly to a band fastening tool used when a plastic or metal band formed into a belt shape is attached to, for example, a protective plate for a telegraph pole and when cargo or the like is bound.

BACKGROUND ART

In a band fastening tool, there has been known one in which a rotary lever is rotatably attached to a main body, a band insertion hole is formed at a base of the rotary lever, one end of a band fixed to the main body by folding back the other end is linearly inserted through the insertion hole from a rear side of the rotary lever in such a state that the rotary lever is rotated to an opening position with respect to the main body, and the rotary lever is brought into a closed state by being rotated to a closing position on the main body side to roll a band, and thus to fasten the band between the main body and the rotary lever, whereby the band is fixed.

CITATION LIST

Patent Literature

[PTL 1] JP 10-9222 A

SUMMARY OF INVENTION

Technical Problem

In the above conventional band fastening tool, a locking protrusion of the rotary lever is engaged with a locking hole provided in the main body to prevent the rotary lever in the closed state from opening, and, thus, to fasten and fix the band in a tensioned state.

However, mere engagement between the locking protrusion of the rotary lever and the locking hole of the main body cannot obtain sufficient resistance against a tensile force of bringing the band into the tensioned state, since the locking protrusion and the locking hole are exposed, the engagement between the locking protrusion and the locking hole is released by impact and vibration from the outside and temporal deformation, and there is a problem that it is difficult to continuously maintain the rotary lever in the closed state.

In some conventional band fastening tools, although concavoconvex shaped anti-slip portions preventing slipping of a band are formed in the locking hole of the main body and the insertion hole of the rotary lever, the anti-slip portions are arranged so that in the width direction of the band, the protruding length at the center is the same as the protruding length on the both side. Thus, the concavoconvex portions of the anti-slip portion are abutted against the inside of a folded portion of the band in the width direction with equal force. Consequently, the anti-slip portions are hardly caught on the band, and slipping of the band cannot be satisfactorily prevented, so that fastening of the band may be loosened.

The present invention provides a band fastening tool, and an object of the band fastening tool is to firmly maintain a rotary lever in a closed state against a tensile force of a band regardless of impact and vibration from the outside and temporal deformation, prevent the rotary lever from being rotated to an opening position, satisfactorily precludes slipping of the band inserted through a locking hole of a main body and an insertion hole of the rotary lever, and prevent fastening of the band from being loosened.

Solution to Problem

A band fastening tool according to claim 1 of the present invention is constituted of a main body having a bearing and a rotary lever having a rotary shaft rotatably engaged with the bearing of the main body, while one end of a band is locked by being inserted through a locking hole of the main body, the other end of the band is inserted through an insertion hole of the rotary lever rotated to an opening position with respect to the main body, and the rotary lever is rotated to a closing position with respect to the main body to wind the band around a winding shaft of the rotary lever, and thus to fasten the band, whereby the band is fixed while being held between the main body and the rotary lever. In the band fastening tool, the bearing of the main body is provided with a guide surface inclined to move the rotary shaft of the rotary lever in a direction in which a tensile force of the band acts and a direction approaching a bottom plate of the main body, the guide surface of the bearing is provided with a protrusion extending in a direction perpendicular to the tensile force of the band, the rotary shaft is provided with a cut-out engaged with the protrusion of the bearing in such a state that the rotary lever rotated to a closing position is moved in the direction in which the tensile force of the band acts and the direction approaching the bottom plate of the main body, the winding shaft of the rotary lever is formed into a cam shape having a base shaft portion which is spaced apart from the bottom plate of the main body and a projecting portion which protrudes from the base shaft portion to press the band onto the bottom plate of the main body in such a state that the rotary lever is rotated to the closing position, the rotary lever has, between the rotary lever and the winding shaft, an insertion hole wall for forming an insertion hole through which the band is inserted toward the protrusion, an engagement claw, which has an engagement surface inclined in a direction in which a tensile force of the band acts and a direction approaching a bottom plate of the main body, is provided on an upper surface of the bottom plate of the main body, a claw receiver having a receiving surface abutted against the engagement surface of the engagement claw is provided on a lower surface of an upper plate of the rotary lever, as the rotary lever in which the band is inserted through the insertion hole is rotated to the closing position, winding of the band along the base shaft portion of the winding shaft and fixing of the band between the bottom plate of the main body and the projecting portion of the winding shaft are promoted, when the receiving surface of the claw receiver of the rotary lever rotated to the closing position is abutted against the engagement surface of the engagement claw of the main body, and, at the same time, when the rotary lever is moved in the direction in which the tensile force of the band acts in such a state that the rotary shaft is abutted against the guide surface of the bearing, while the engagement between the claw receiver of the rotary lever and the engagement claw of the main body progresses, the rotary shaft moves along the guide surface of the bearing in the direction approaching the bottom plate of the main body to engage the cut-out with the protrusion of the bearing, and the band is fixed by being pressed between the bottom plate of the main body and the projecting portion of the winding shaft.

In the invention of claim 2 according to claim 1, in the locking hole of the main body, a concavoconvex-shaped anti-slip portions is disposed arranged at a hole edge located inside a folded portion of the band so that in the width direction of the band, the protruding length at the center is different from the protruding length on the both side, and in the insertion hole of the rotary lever, the concavoconvex-shaped anti-slip portions are arranged at a front end of the insertion hole wall located inside the folded portion of the band so that in the width direction of the band, the protruding length at the center is different from the protruding length on the both side.

In the invention of claim 3 according to claim 1 or 2, the rotary lever is provided with a guide wall which guides the band so that the band drawn from the insertion hole is folded at an acute angle along the front end of the insertion hole wall.

In the invention of claim 4 according to claim 1, the engagement claw of the main body and the claw receiver of the rotary lever are covered by the upper plate of the rotary lever in a state of being engaged with each other.

In the invention of claim 5 according to claim 1, the guide surface of the bearing of the main body is provided with a plurality of concavoconvex strips extending in a direction perpendicular to the tensile force of the band, the rotary shaft is provided with an abutment surface abutted against the guide surface of the bearing in such a state that the rotary lever is rotated to the closing position, the abutment surface of the rotary shaft is provided with a plurality of concavoconvex strips engaged with the concavoconvex strips of the bearing in such a state that the rotary lever is rotated to the closing position, the engagement surface of the engagement claw of the main body is provided with a plurality of concavoconvex strips extending in the direction perpendicular to the tensile force of the band, and the receiving surface of the claw receiver of the rotary lever is provided with a plurality of concavoconvex strips engaged with the concavoconvex strips of the engagement claw.

Advantageous Effects of Invention

In the band fastening tool of claim 1 of the present invention, when a rotary lever rotated to a closing position is moved in a direction in which a tensile force of a band acts, engagement between a claw receiver of the rotary lever and an engagement claw of a main body progresses, and, at the same time, the rotary shaft moves along a guide surface of a bearing in a direction approaching a bottom plate of the main body to engage a cut-out of the rotary shaft with the protrusion of the bearing. According to this constitution, in the band fastening tool, the rotary lever can be firmly maintained in a closed state against the tensile force of the band by the engagement between the claw receiver and the engagement claw and the engagement between the cut-out and the protrusion, regardless of impact and vibration from the outside and temporal deformation, and the rotary lever can be prevented from being rotated to an opening position.

In the band fastening tool of claim 2 of the present invention, an anti-slip portion of an engagement hole of the main body and an anti-slip portion of an insertion hole of the rotary lever are arranged in a curved manner so that in the width direction of the band, the protruding length at the center is different from the protruding length on the both sides. According to this constitution, in the band fastening tool, since the concavoconvex-shaped anti-slip portion can be abutted against inside of a folded portion of the band with different forces in the width direction, the anti-slip portion can be easily caught on the band, slipping of the band can be satisfactorily precluded, and fastening of the band can be prevented from being loosened.

In the band fastening tool of claim 3 of the present invention, the rotary lever is provided with a guide wall which guides the band so that the band drawn from the insertion hole is folded at an acute angle along the front end of the insertion hole wall, whereby an anti-slip portion of the insertion hole can be more easily caught on the inside of the folded portion of the band, slipping of the band can be more satisfactorily precluded, and fastening of the band can be more reliably prevented from being loosened.

In the band fastening tool of claim 4 of the present invention, since the engagement claw of the main body and the claw receiver of the rotary lever are covered by the upper plate of the rotary lever in a state of being engaged with each other, engagement can be prevented from being released by being protected from impact and vibration from the outside.

In the band fastening tool of claim 5 of the present invention, when the rotary lever rotated to the closing position is moved in the direction in which the tensile force of the band acts, the concavoconvex strips of the claw receiver of the rotary lever are engaged with the concavoconvex strips of the engagement claw of the main body, and, at the same time, the concavoconvex strips of the rotary shaft is engaged with the concavoconvex strips of the guide surface of the bearing, whereby the rotary lever can be firmly maintained in a closed state against the tensile force of the band regardless of impact and vibration from the outside and temporal deformation, and the rotary lever can be prevented from being rotated to an opening position.

DESCRIPTION OF EMBODIMENTS

Hereinafter, embodiments of the present invention will be described based on drawings.

Embodiment 1

Figure 1:
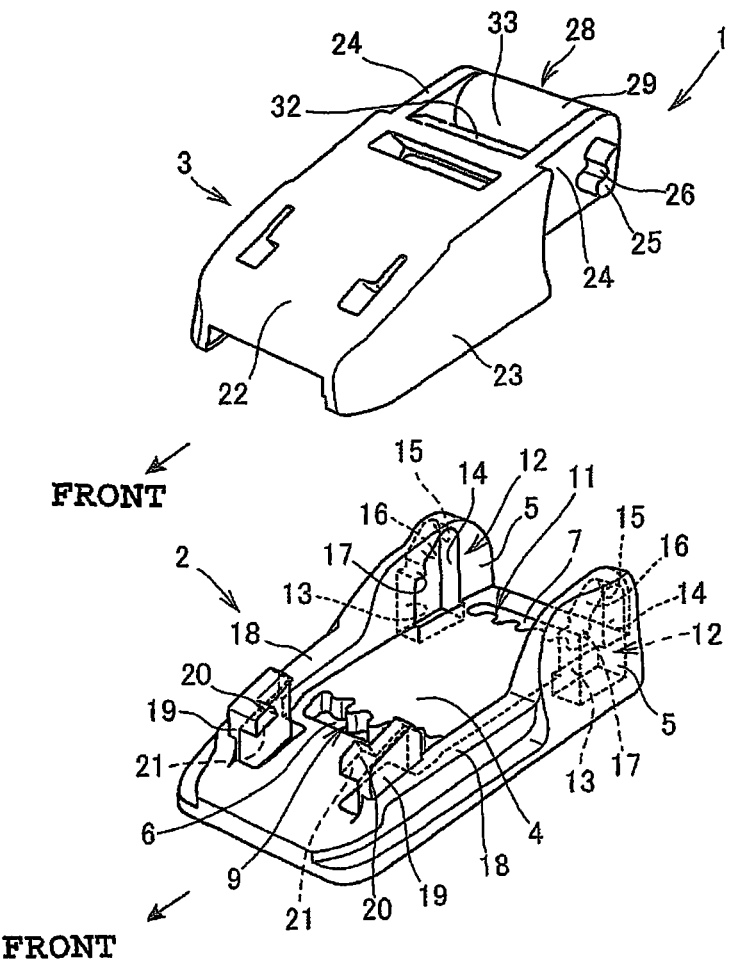
FIG. 1 is a perspective view showing an assembled state of a band fastening tool (Embodiment 1).

FIGS. 1 to 20 show Embodiment 1 of a band fastening tool according to the present embodiment. In FIG. 1, a band fastening tool 1 is constituted of a main body 2 and a rotary lever 3 produced as plastic molded articles. As shown in FIGS. 14 to 20 to be described later, the band fastening tool 1 is used for fastening and fixing of a polyester band B formed into a belt shape.

Figure 2:
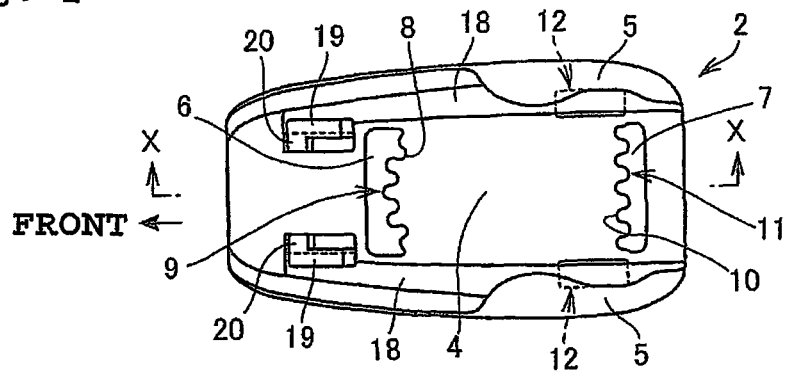
FIG. 2 is a plan view of a main body (Embodiment 1).
Figure 3:
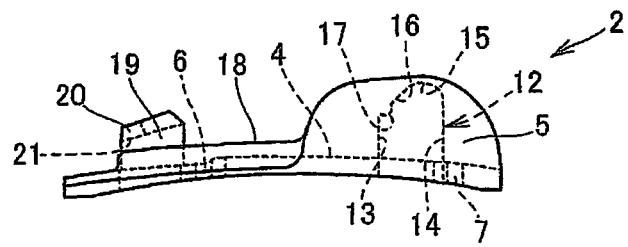
FIG. 3 is a side view of the main body (Embodiment 1).
Figure 4:
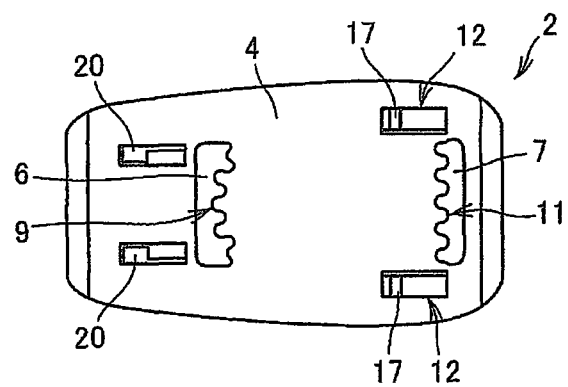
FIG. 4 is a bottom view of the main body (Embodiment 1).
Figure 5:
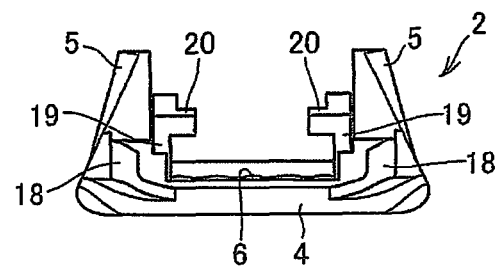
FIG. 5 is a front view of the main body (Embodiment 1).
Figure 6:
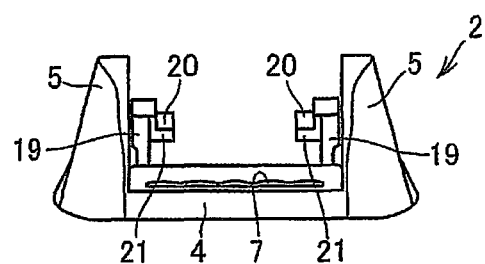
FIG. 6 is a rear view of the main body (Embodiment 1).

As shown in FIGS. 2 to 7, the main body 2 is constituted of a substantially rectangular bottom plate 4 curved to gradually project upward in a longitudinal direction and side plates 5, 5 provided upright on both sides in a width direction of the bottom plate 4 on the rear side (the right side in FIGS. 2 and 3).

In the bottom plate 4 of the main body 2, a locking hole 6 for locking a band is formed at a position closer to an intermediate position than the front side (the left side in FIGS. 2 and 3), and a locking hole 7 for locking a band is formed on the rear side. In the locking hole 6 closer to the intermediate position, a concavoconvex-shaped anti-slip portion 9 is formed at a hole edge 8 located inside a folded portion of the band B so that the band B is easily caught on the locking hole 6. The anti-slip portion 9 is disposed in a curved manner so that in the width direction of the band B, the protruding length at the center is different from the protruding length on the both sides. In the locking hole 7 on the rear side, a concavoconvex-shaped anti-slip portion 11 is formed at a hole edge 10 located inside a folded portion of the band B so that the band B is easily caught on the locking hole 7. The anti-slip portion 11 is disposed linearly so that in the width direction of the band B, the protruding length at the center is the same as the protruding length on the both sides.

Figure 7:
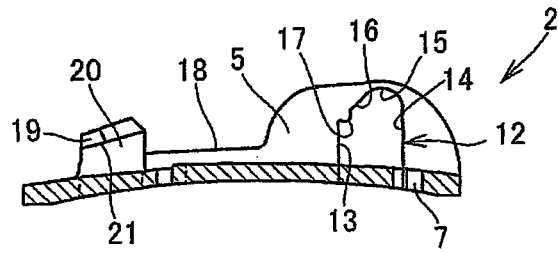
FIG. 7 is a cross-sectional view of the main body taken by a line X-X of FIG. 2 (Embodiment 1).
Figure 8:
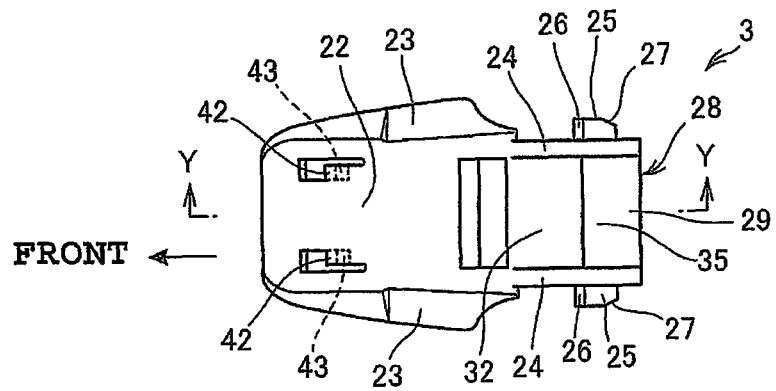
FIG. 8 is a plan view of a rotary lever (Embodiment 1).
Figure 9:
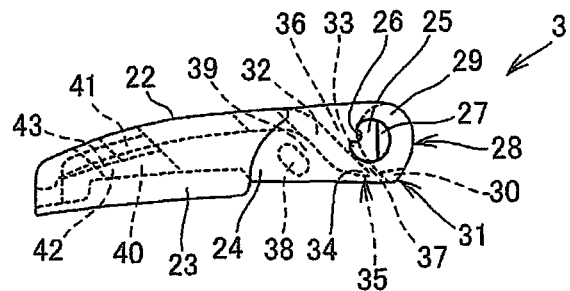
FIG. 9 is a side view of the rotary lever (Embodiment 1).
Figure 10:
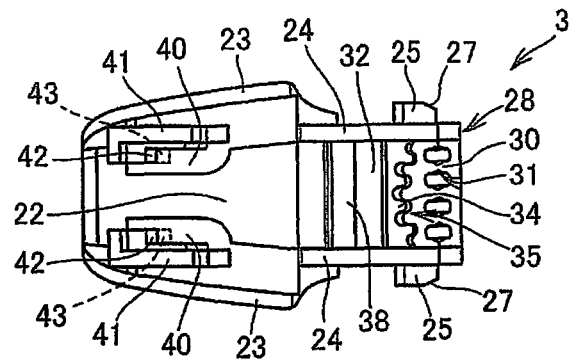
FIG. 10 is a bottom view of the rotary lever (Embodiment 1).
Figure 11:
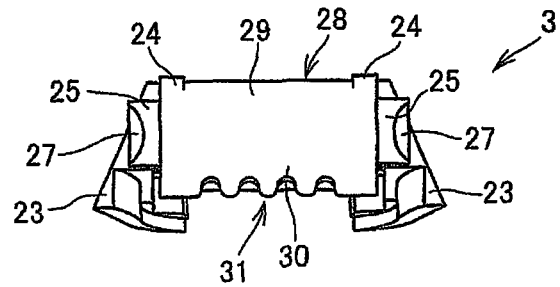
FIG. 11 is a front view of the rotary lever (Embodiment 1).
Figure 12:
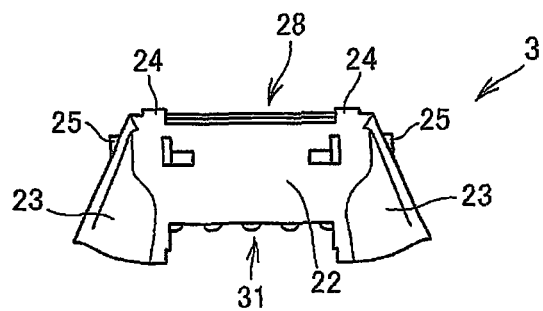
FIG. 12 is a rear view of the rotary lever (Embodiment 1).
Figure 13:
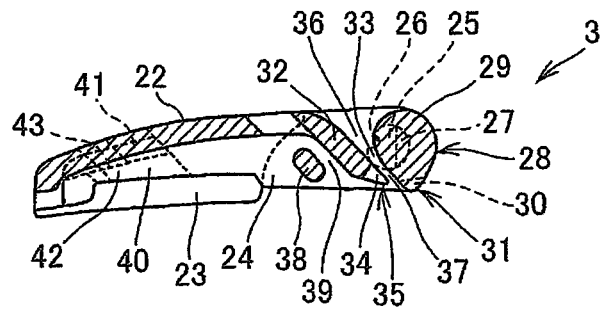
FIG. 13 is a cross-sectional view of the rotary lever taken by a line Y-Y of FIG. 8 (Embodiment 1).

In the main body 2, bearings 12, 12 are provided inside the both side plates 5, 5. As shown in FIGS. 1 and 7, each of the bearings 12, 12 includes parallel flat surfaces 13, 14, which each has such a shape that rotary shafts 25, 25 (see, FIG. 1) of the rotary lever 3, which will be described later, can be slidable vertically, a curved surface 15 formed from an upper end of the flat surface 14 on the rear side, curved forward, and then directed downward, and a planar guide surface 16 descending from a lower end of the curved surface 15 toward the upper end of the flat surface 14 on the front side, and the bearings 12, 12 are formed inside the both side plates 5, 5 so as to be recessed in a substantially trapezoidal shape.

Each of the guide surfaces 16, 16 is inclined from a rear upper side to a front lower side in the main body 2 so that the rotary shafts 25, 25 of the rotary lever 3, which will be described later, are moved in a direction (the left side in FIG. 7) in which a tensile force of the band B acts and a direction approaching the bottom plate 4 of the main body 2. Each of the guide surfaces 16, 16 includes, near the lower end close to the upper end of the flat surface 14, wide protrusions 17, 17 extending in a direction perpendicular to the direction in which the tensile force of the band B acts.

Further, in the main body 2, protruding edges 18, 18 extending from the both side plates 5, 5 toward the front side are formed on the upper surface of the bottom plate 4. Standing walls 19, 19 are formed inside the front ends of the protruding edges 18, 18. Engagement claws 20, 20 are provided inside the upper ends of the standing walls 19, 19. The engagement claws 20, 20 have on their lower surfaces planar engagement surfaces 21, 21 inclined in the direction in which the tensile force of the band B acts and the direction approaching the bottom plate 4 of the main body 2.

As shown in FIGS. 1 and 8 to 13, the rotary lever 3 is constituted of a substantially rectangular upper plate 22 curved to gradually project upward in a longitudinal direction, front side plates 23, 23 perpendicularly provided diagonally from the both sides in the width direction of the upper plate 22, and rear side plates 24, 24 projectingly provided in parallel from the rear sides (the right sides in FIGS. 8 and 9) of the upper plate 22 and the front side plates 23, 23.

The rotary shafts 25, 25 are provided outside the rear side plates 24, 24 of the rotary lever 3. The rotary shafts 25, 25 are provided with cut-outs 26, 26 engaged with the protrusions 17, 17 of the bearings 12, 12 in such a state that the rotary lever 3 rotated to a closing position is moved in the direction (the left side in FIG. 9) in which the tensile force of the band B acts and the direction approaching the bottom plate 4 of the main body 2. The rotary shafts 25, 25 are further provided with inclined cut-outs 27, 27 on the rear side. The rotary shafts 25, 25 are rotatably attached to hollows of the bearings 12, 12 by using the fact that in the attachment of the rotary shafts 25, 25 to the main body 2, when the inclined cut-outs 27, 27 are abutted against inside of the upper sides of the side plates 5, 5 on the bearings 12, 12 of the main body 2 and pushed therein, the plastic side plates 5, 5 are opened by elastic deformation.

According to the above constitution, the rotary lever 3 can rotate to an opening position and the closing position with respect to the main body 2 and is attached to the main body 2 so as to be movable vertically along the flat surfaces 13, 14 and movable from a rear upper side to a front lower side in the direction approaching the bottom plate 4.

In the rotary lever 3, a winding shaft 28 is provided inside the rear ends of the rear side plates 24 and 24. The winding shaft 28 has a substantially cylindrical base shaft portion 29 and a projecting portion 30 projecting in a substantially triangular pyramid shape from the base shaft portion 29 and is formed into a cam shape having a cross section connecting outer circumferences of two large and small circles. The base shaft portion 29 is formed to be spaced apart from the bottom plate 4 of the main body 2 even in such a state that the rotary lever 3 is rotated to either the opening position or the closing position. The projecting portion 30 is formed to be projected from the base shaft portion 29 so that the band B is pressed onto the bottom plate 4 of the main body 2 in such a state that the rotary lever 3 is rotated to the closing position. The projecting portion 30 has at its front end a concavoconvex-shaped anti-slip portion 31 formed in the width direction of the band B so that the band B can be easily held between the projecting portion 30 and the bottom plate 4 of the main body 2.

In the rotary lever 3, an insertion hole wall 32 is provided inside the rear side plates 24, 24 and diagonally disposed in front of the winding shaft 28. In the insertion hole wall 32, an insertion hole 33 through which the band B is inserted between the insertion hole wall 32 and the winding shaft 28 from the base shaft portion 29 side toward the projecting portion 30 is formed. In the insertion hole 33, a concavoconvex-shaped anti-slip portion 35 is formed at a front end portion 34 of the insertion hole wall 32 located inside the folded portion of the band B. The anti-slip portion 35 is disposed in a curved manner so that in the width direction of the band B, the protruding length at the center is different from the protruding length on the both sides. The band B is inserted from an entrance 36 on the upper plate 22 side of the insertion hole 33 and drawn from an exit 37 on the front end portion 34 side.

Further, a guide wall 38 is provided inside the rear side plates 24, 24 of the rotary lever 3 and disposed diagonally in front of the insertion hole wall 32, and a guide hole 39 is formed between the guide wall 38 and the insertion hole wall 32. The guide wall 38 guides the band B into the guide hole 39 so that the band B drawn from the insertion hole 33 is folded at an acute angle along the front end portion 34 of the insertion hole wall 32.

The rotary lever 3 has thick portions 40, 40 provided on the lower surface of the upper plate 22 along the inside in the width direction of the front side plates 23, 23. The thick portions 40, 40 are provided with fitting grooves 41, 41 into which the two standing walls 19, 19 and the engagement claws 20, 20 of the main body 2 are fitted. The thick portions 40, 40 are further provided with claw receivers 42, 42 continuing to the fitting grooves 41, 41 and engaged with the engagement claws 20, 20. The claw receivers 42, 42 have on their upper surfaces receiving surfaces 43, 43 abutted against the engagement surfaces 21, 21 of the engagement claws 20, 20. The engagement claws 20, 20 of the main body 2 and the claw receivers 42, 42 of the rotary lever 3 are covered by the upper plate 22 of the rotary lever 3 in such a state that the rotary lever 3 is rotated to the closing position to abut the receiving surfaces 43, 43 against the engagement surfaces 21, 21, and thus to engage the receiving surfaces 43, 43 with the engagement surfaces 21, 21.

Next, the operation will be explained.

As shown in FIGS. 14 to 19, when a protective plate or the like is fixed to a fastened member C such as a telegraph pole with the band B by using the band fastening tool 1 having the above constitution, the length of the band B is previously set to be larger than a fixed outer circumference length of the fastened member C, and the end of the band B is fixed to the main body 2.

Figure 14:
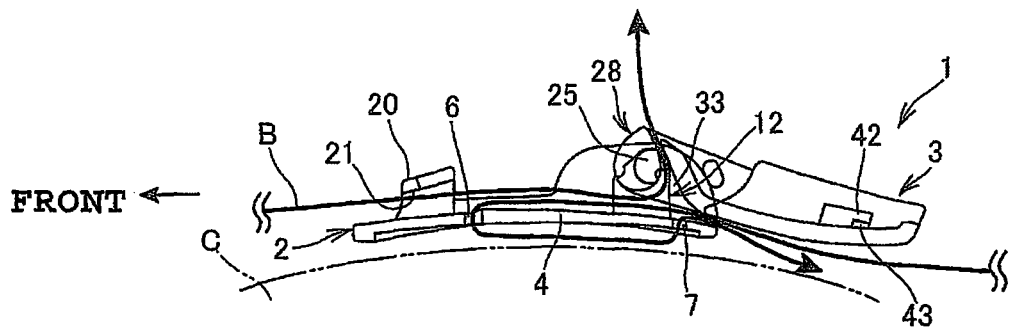
FIG. 14 is a cross-sectional view of a state in which one end of a band is temporarily fixed to the main body when the rotary lever is in an opening state (Embodiment 1).

As shown in FIG. 14, in the band fastening tool 1, one end of the band B is inserted between the bottom plate 4 and the winding shaft 28 of the rotary lever 3 from the rear side of the main body 2 in such a state that the rotary lever 3 is rotated to the opening position to be fed to the lower side of the bottom plate 4 through the locking hole 6 near the center, and thus to be folded back to the rear side of the bottom plate 4, and one end of the band B is then passed to the upper side of the bottom plate 4 through the locking hole 7 on the rear side. Further, one end of the band B is fixed at a position where the end is drawn to the rear side along the band B. In this state, fixing of one end of the band B is completed in the band fastening tool 1. The other end of the band B is not attached to the rotary lever 3 and is a free end.

In the band fastening tool 1 in which one end of the band B is locked to the main body 2, the rotary lever 3 is disposed on a circumferential surface of the fastened member C in a state of being rotated to the opening position, and the other end of the band B arranged to the fastened member C is inserted between the bottom plate 4 and the winding shaft 28 from the front side of the main body 2 to be further inserted from the entrance 36 of the insertion hole 33, and thus to be drawn from the exit 37 of the insertion hole 33.

At this point, due to the elasticity of the band B obtained when the folded band B tries to return to a flat plate shape, a force of lifting the rotary shafts 25, 25 of the rotary lever 3 acts on the rotary shafts 25, 25, and the rotary shafts 25, 25 are lifted to the position abutted against the curved surface 15 along the flat surfaces 13, 14 of the bearings 12, 12 of the main body 2. Deflection of the wrapped band B is confirmed and adjusted, the band B drawn upward through the insertion hole 33 is further pulled, and the band B is firmly temporarily fixed.

Figure 15:
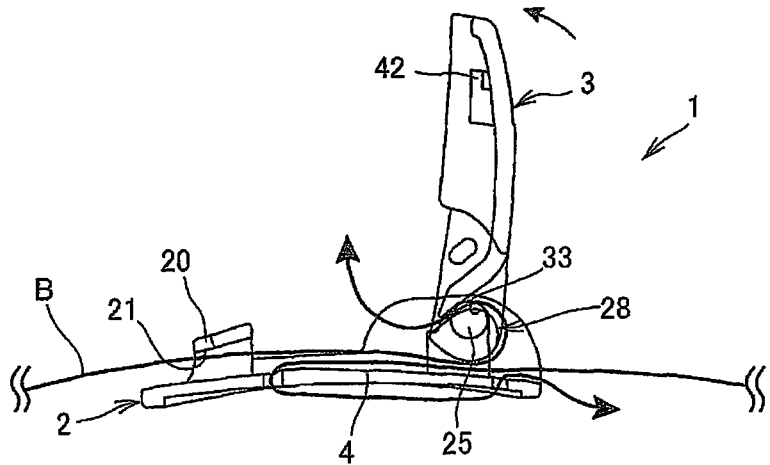
FIG. 15 is a cross-sectional view of a state in which the band starts to be fixed accompanying rotation of the rotary lever (Embodiment 1).

Next, as shown in FIG. 15, in the band fastening tool 1, when the front end side of the rotary lever 3 at the opening position is rotated toward the front end of the main body 2, the winding shaft 28 and the insertion hole 33 are rotated, and the band B starts to be wound around the winding shaft 28 with a tensile resistance value whose upper limit is resistance against return occurring due to an increased band path. When loosening of the band B is large when the band B is initially temporarily fixed, the winding of the belt B around the winding shaft 28 progresses; however, when initial fastening is large, the belt B is slipped at a resistance tension limit to be firmly fastened.

Figure 16:
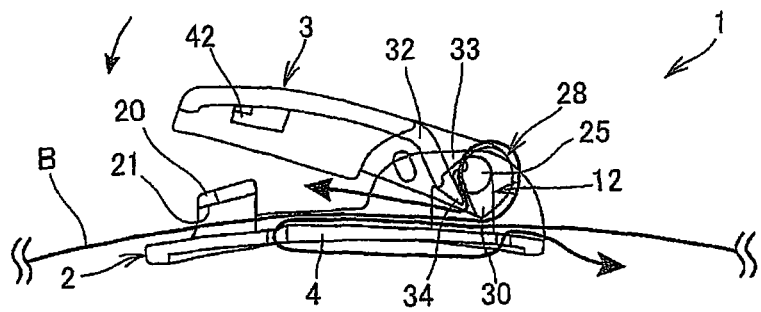
FIG. 16 is a cross-sectional view of a state in which a rotary lever rotates toward a closing position (Embodiment 1).

As shown in FIG. 16, in the band fastening tool 1, as the rotary lever 3 is rotated, by virtue of the winding around the winding shaft 28, the band B is pressed onto the bottom plate 4 of the main body 2 by the projecting portion 30 at a cam-shaped front end of the winding shaft 28 and starts to be fixed. The resistance against the return of the band B increases when the path of the band B abutted against the front end portion 34 of the insertion hole wall 32 begins to become acute, the band B starts to be fixed between the bottom plate 4 of the main body 2 and the projecting portion 30 of the winding shaft 28, and the band B is thereafter rolled into the base shaft portion 29 of the winding shaft 28 and approaches a firmly fixed state.

Figure 17:
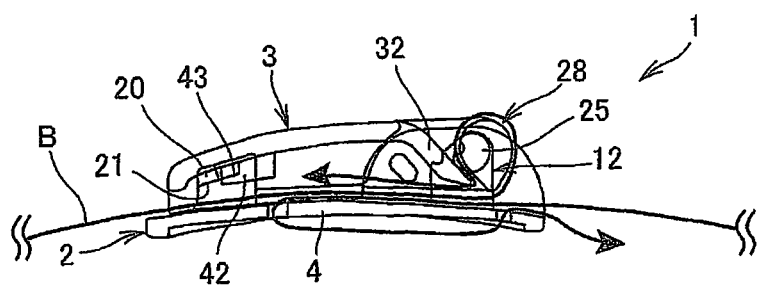
FIG. 17 is a cross-sectional view of a state in which when the rotary lever is at the closing position, a claw receiver is abutted against an engagement claw of a main body, and a cut-out of a rotary shaft is abutted against a protrusion of a bearing (Embodiment 1).

The rotation of the rotary lever 3 further progresses, the projecting portion 30 at the cam-shaped front end of the winding shaft 28 passes through the closest position on the upper surface of the bottom plate 4 of the main body 2 from the front side to the rear side. As shown in FIG. 17, when the rotary lever 3 is rotated to the closing position, in the band fastening tool 1, the claw receivers 42, 42 of the rotary lever 3 are in a state of facing the engagement claws 20, 20 of the main body 2, and the cut-outs 26, 26 of the rotary shafts 25, 25 of the rotary lever 3 are in a state of being abutted against the guide surfaces 16, 16 of the bearings 12, 12 of the main body 2.

Figure 18:
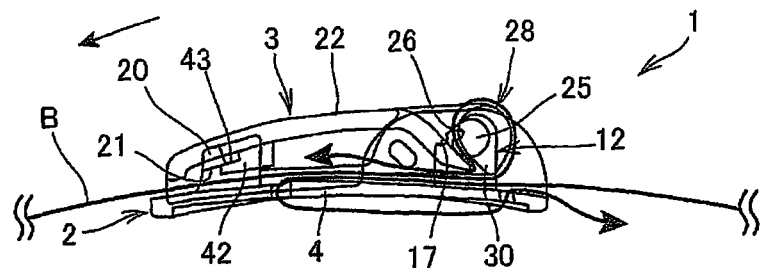
FIG. 18 is a cross-sectional view of a state in which when the rotary lever is at the closing position, the claw receiver starts to be engaged with the engagement claw of the main body, and the cut-out of the rotary shaft starts to be engaged with the protrusion of the bearing (Embodiment 1).

As shown in FIG. 18, when the rotary lever 3 in the state shown in FIG. 17 is moved in the direction in which the tensile force of the band B acts in such a state that the receiving surfaces 43, 43 of the claw receivers 42, 42 of the rotary lever 3 are abutted against the engagement surfaces 21, 21 of the engagement claws 20, 20 of the main body 2, and the cut-outs 26, 26 of the rotary shafts 25, 25 are abutted against the guide surfaces 16, 16 of the bearings 12, 12 of the main body 2, the receiving surfaces 43, 43 of the claw receivers 42, 42 of the rotary lever 3 move along the engagement surfaces 21, 21 of the engagement claws 20, 20 of the main body 2 to progress the engagement between the claw receivers 42, 42 and the engagement claws 20, 20, and a rotary shaft 24 of the rotary lever 2 moves along the guide surface 16, 16 of the bearings 12, 12 of the main body 2 in the direction approaching the bottom plate 4 of the main body 2.

Figure 19:
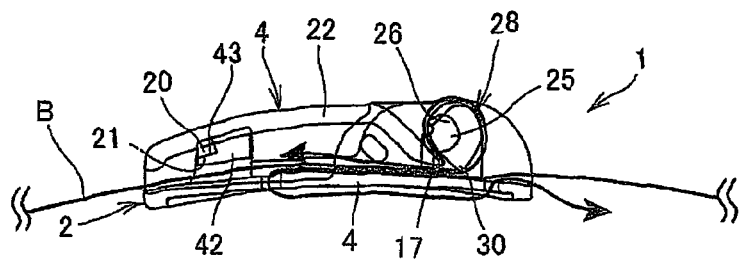
FIG. 19 is a cross-sectional view of a state in which when the rotary lever is in a closed state, the engagement of the claw receiver with the engagement claw of the main body is completed, and the engagement of the cut-out of the rotary shaft with the protrusion of the bearing is completed (Embodiment 1).

When the operation progresses in the band fastening tool 1, the engagement between the claw receivers 42, 42 of the rotary lever 3 and the engagement claws 20, 20 of the main body 2 is completed, and, at the same time, the rotary shaft 24 moving along the guide surfaces 16, 16 run on the protrusions 17, 17 to complete the engagement between the cut-outs 26, 26 and the protrusions 17, 17. As shown in FIG. 19, in the band fastening tool 1, when the engagement between the claw receivers 42, 42 of the rotary lever 3 and the engagement claws 20, 20 of the main body 2 is completed, and when the engagement between the cut-outs 26, 26 of the rotary shaft 24 and the protrusions 17, 17 of the bearings 12, 12 is completed, the rotary lever 3 is in the closed state. The claw receivers 42, 42 and the engagement claws 20, 20 in the engagement state are covered by the upper plate 22 of the rotary lever 3 in the closed state. The operation of approaching the rotary shaft 24 to the bottom plate 4 of the main body 2 increases the force of holding the band B between the bottom plate 4 of the main body 2 and the projecting portion 30 of the winding shaft 28, and the band B is fixed.

As described above, in the band fastening tool 1, the rotary lever 3 rotated to the closing position is moved in the direction in which the tensile force of the band B acts, the engagement between the claw receivers 42, 42 of the rotary lever 3 and the engagement claws 20, 20 of the main body 2 progresses, and, at the same time, the rotary shafts 25, 25 move along the guide surfaces 16, 16 of the bearings 12, 12 in the direction approaching the bottom plate 4 of the main body 2, and the cut-outs 26, 26 of the rotary shafts 25, 25 are engaged with the protrusions 17, 17 of the bearings 12, 12. According to this constitution, in the band fastening tool 1, since the claw receivers 42, 42 are engaged with the engagement claws 20, 20, and cut-outs 26, 26 are engaged with the protrusions 17, 17, the rotary lever 3 can be firmly maintained in the closed state against the tensile force of the band B regardless of impact and vibration from the outside and temporal deformation, and the rotary lever 3 can be prevented from being rotated to the opening position.

Further, in the band fastening tool 1, the anti-slip portion 9 of the locking hole 6 of the main body 2 and the anti-slip portion 35 of the insertion hole 33 of the rotary lever 2 are arranged in a curved manner so that in the width direction of the band B, the protruding length at the center is different from the protruding length on the both sides. According to this constitution, in the band fastening tool 1, since the concavoconvex-shaped anti-slip portions 9 and 35 can be abutted against inside the folded portion of the band B with different forces in the width direction, the anti-slip portions 9 and 35 can be easily caught on the band B, slipping of the band B can be satisfactorily prevented, and fastening of the band B can be prevented from being loosened.

Figure 20:
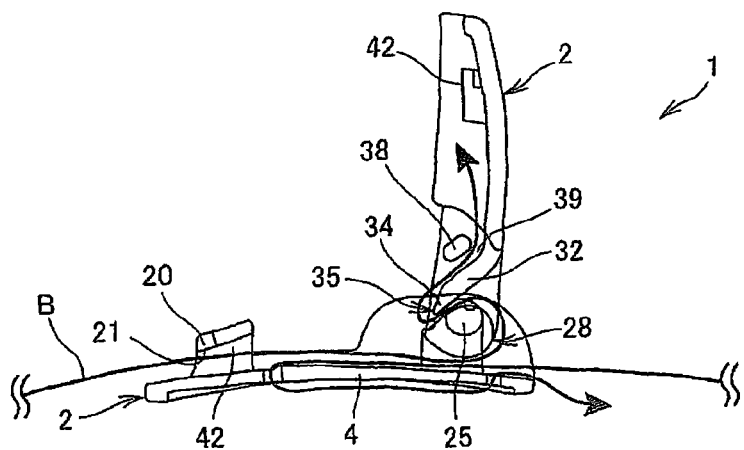
FIG. 20 is a cross-sectional view of a state in which the band is temporarily fixed when the rotary lever is in the opening state with respect to the main body (Embodiment 1).

In Embodiment 1, as shown in FIG. 15, although the other end of the band B is merely inserted from the entrance 36 of the insertion hole 33 and drawn from the exit 37, the band B drawn from the insertion hole 33 can be guided into the guide hole 39 formed to approach the insertion hole wall 32, as shown in FIG. 20.

In the band fastening tool 1 shown in FIG. 20, the rotary lever 3 has the guide wall 38 which guides the band B into the guide hole 39 so that the band B drawn from the insertion hole 33 is folded at an acute angle along the front end portion 34 of the insertion hole wall 32, whereby the anti-slip portion 35 of the insertion hole 33 can be more easily caught inside the folded portion of the band B, slipping of the band B can be more satisfactorily precluded, and fastening of the band B can be more reliably prevented from being loosened.

Furthermore, in the band fastening tool 1, since the engagement claws 20, 20 of the main body 2 and the claw receivers 42, 42 of the rotary lever 3 are covered by the upper plate 22 of the rotary lever 3 in such a state that the engagement claws 20, 20 and the claw receivers 42, 42 are engaged with each other, the engagement can be prevented from being released by being protected from impact and vibration from the outside.

Embodiment 2

Figure 21:
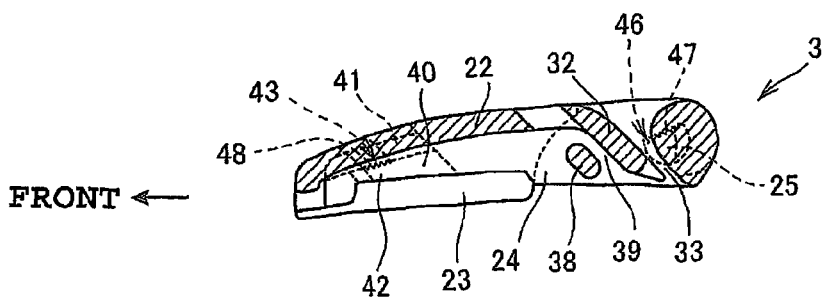
FIG. 21 is a cross-sectional view of the rotary lever (Embodiment 2).
Figure 22:
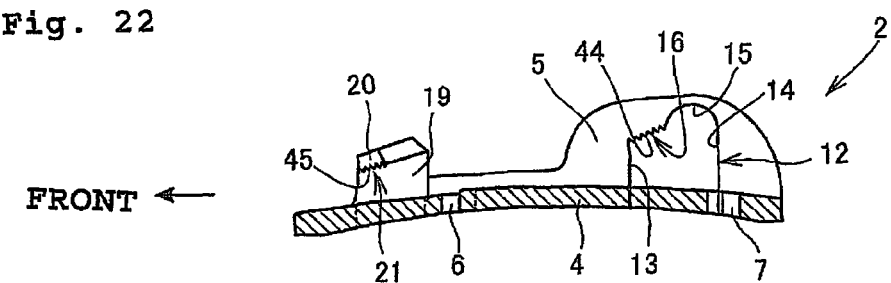
FIG. 22 is a cross-sectional view of the main body (Embodiment 2).

FIGS. 21 to 30 show Embodiment 2 of the band fastening tool according to the present embodiment. As shown in FIG. 22, each of the bearings 12, 12 of the main body 2 of the Embodiment 2 includes the parallel flat surfaces 13, 14, which each has such a shape that the rotary shafts 25, 25 of the rotary lever 3 are slidable vertically, the curved surface 15 formed from the upper end of the flat surface 14 on the rear side, curved forward, and then directed downward, and the planar guide surface 16 descending from a lower end of the curved surface 15 toward the upper end of the flat surface 13 on the front side, and each of the bearings 12, 12 is formed inside the both side plates 5, 5 so as to be recessed in a substantially trapezoidal shape.

Each of the guide surfaces 16, 16 is inclined from the rear upper side to the front lower side in the main body 2 so that the rotary shafts 25, 25 of the rotary lever 3 are moved in the direction (the left side in FIG. 22) in which the tensile force of the band B acts and the direction approaching the bottom plate 4 of the main body 2. Each of the guide surfaces 16, 16 includes a plurality of concavoconvex strips 44, 44 provided between the upper end connected to the curved surface 15 and the lower end connected to the flat surface 14 and extending in the direction perpendicular to the direction in which the tensile force of the band B acts.

Further, in the main body 2, the standing walls 19, 19 formed inside the front ends of the protruding edges 18, 18 extending from the both side plates 5, 5 toward the front side are provided on the upper surface of the bottom plate 4. The engagement claws 20, 20 are provided inside the upper ends of the standing walls 19, 19. The engagement surfaces 20, 20 have on their lower surfaces the planar engagement surfaces 21, 21 inclined in the direction in which the tensile force of the band B acts and the direction approaching the bottom plate 4 of the main body 2. The engagement surfaces 21, 21 of the engagement claws 20, 20 have a plurality of concavoconvex strips 45, 45 extending in the direction perpendicular to the direction in which the tensile force of the band B acts.

Meanwhile, as shown in FIG. 21, in the rotary shafts 25, 25 provided outside the rear side plates 24, 24 of the rotary lever 3, the inclined cut-outs 27, 27 are provided on the rear side. The rotary shafts 25, 25 have abutment surfaces 46, 46 abutted against the guide surfaces 16, 16 of the bearings 12, 12 in such a state that the rotary lever 3 is rotated to the closing position. The abutment surfaces 46, 46 of the rotary shafts 25, 25 have a plurality of concavoconvex strips 47, 47 engaged with the concavoconvex strips 44, 44 of the guide surfaces 16, 16 of the bearings 12, 12 in such a state that the rotary lever 3 is rotated to the closing position.

The thick portions 40, 40 under the upper plate 22 of the rotary lever 3 are provided with the fitting grooves 41, 41 into which the standing walls 19, 19 and the engagement claws 20, 20 of the main body 2 are fitted and further provided with the claw receivers 42, 42 continuing to the fitting grooves 41, 41 and engaged with the engagement claws 20, 20. The claw receivers 42, 42 have on their upper surfaces receiving surfaces 43, 43 abutted against engagement surfaces 20, 20 of the engagement claws 20, 20. The receiving surfaces 43, 43 have a plurality of concavoconvex strips 48, 48 engaged with the concavoconvex strips 45, 45 of the engagement claws 20, 20.

Next, the operation will be explained.

Figure 23:
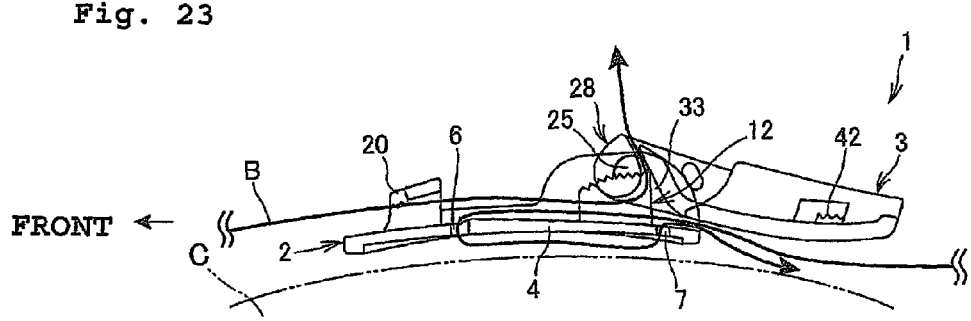
FIG. 23 is a cross-sectional view of a state in which one end of a band is temporarily fixed when the rotary lever is in the opening state with respect to the main body (Embodiment 2).

As shown in FIG. 23, when a protective plate or the like is fixed to the fastened member C such as a telegraph pole with the band B by using the band fastening tool 1 having the above constitution, one end of the band B whose length is previously set to be larger than the fixed outer circumference length of the fastened member C is inserted between the bottom plate 4 and the winding shaft 28 of the rotary lever 3 from the rear side of the main body 2 in such a state that the rotary lever 3 is rotated to the opening position, and the end of the band B is fed to the lower side of the bottom plate 4 through the locking hole 6 near the center to be folded back to the rear side of the bottom plate 4, and thus to be passed to the upper side of the bottom plate 4 through the locking hole 7 on the rear side, and the end of the band B is fixed at a position where the end is drawn to the rear side along the band B.

In the band fastening tool 1, the rotary lever 3 is disposed on the circumferential surface of the fastened member C in a state of being rotated to the opening position, and the other end of the band B arranged to the fastened member C is inserted between the bottom plate 4 and a winding shaft 17 from the front side of the main body 2 to be further inserted from the entrance 36 of the insertion hole 33, and thus to be drawn from the exit 37 of the insertion hole 33.

At this point, due to the elasticity of the band B obtained when the folded band B tries to return to a flat plate shape, the rotary shafts 25, 25 are lifted to the position abutted against the curved surface 15 along the flat surfaces 13, 14 of the bearings 12, 12 of the main body 1. Deflection of the wrapped band B is confirmed and adjusted, the band B drawn upward through the insertion hole 33 is further pulled, and the band B is firmly temporarily fixed.

Figure 24:
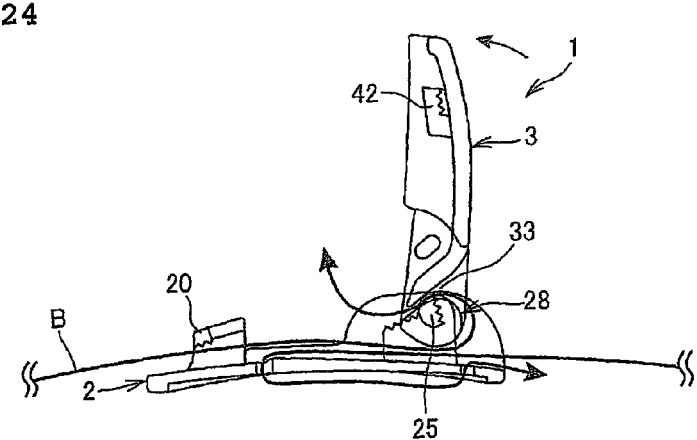
FIG. 24 is a cross-sectional view of a state in which fixing of the band starts accompanying rotation of the rotary lever (Embodiment 2).

Next, as shown in FIG. 24, in the band fastening tool 1, when the front end side of the rotary lever 3 at the opening position is rotated toward the front end of the main body 2, the winding shaft 28 and the insertion hole 33 are rotated, and the band B starts to be wound around the winding shaft 28 with the tensile resistance value whose upper limit is resistance against return occurring due to an increased band path. When loosening of the band B is large when the band B is initially temporarily fixed, the winding of the belt B around the winding shaft 28 progresses; however, when initial fastening is large, the belt B is slipped at a resistance tension limit to be firmly fastened.

Figure 25:
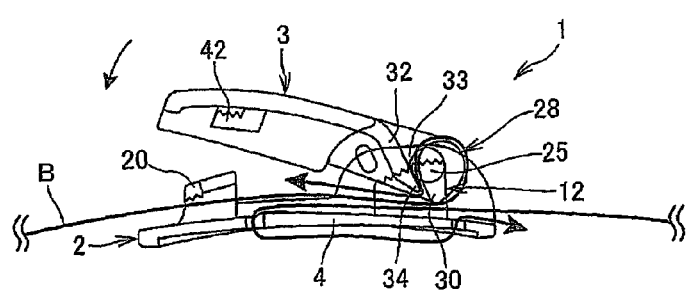
FIG. 25 is a cross-sectional view of a state in which the rotary lever rotates toward the closing position (Embodiment 2).

As shown in FIG. 25, in the band fastening tool 1, as the rotary lever 3 is rotated, by virtue of the winding around the winding shaft 28, the band B is pressed onto the bottom plate 4 of the main body 2 by the projecting portion 30 at the cam-shaped front end of the winding shaft 28 and starts to be fixed. The resistance against the return of the band B increases when the path of the band B abutted against the front end portion 34 of the insertion hole wall 32 begins to become acute, the band B starts to be fixed between the bottom plate 4 of the main body 2 and the projecting portion 30 of the winding shaft 28, and the band B is thereafter rolled into the base shaft portion 29 of the winding shaft 28 and approaches a firmly fixed state.

Figure 26:
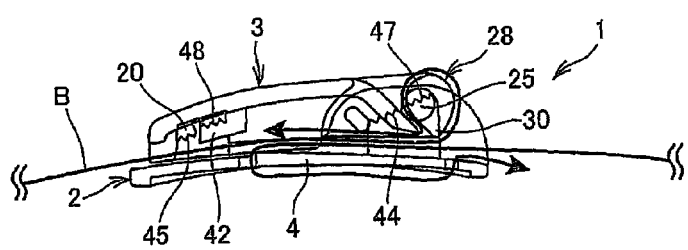
FIG. 26 is a cross-sectional view of a state in which when the rotary lever is at the closing position, the claw receiver faces the engagement claw of the main body, and an abutment surface of the rotary shaft faces a guide surface of a bearing (Embodiment 2).

The rotation of the rotary lever 3 is further progressed, the projecting portion 30 at the cam-shaped front end of the winding shaft 28 passes through the closest position on the upper surface of the bottom plate 4 of the main body 2 from the front side to the rear side. As shown in FIG. 26, when the rotary lever 3 is rotated to the closing position, in the band fastening tool 1, the claw receivers 42, 42 of the rotary lever 3 are in a state of facing the engagement claws 20, 20 of the main body 2, and the abutment surfaces 46, 46 of the rotary shafts 25, 25 are in a state of facing the guide surfaces 16, 16 of the bearings 12, 12 of the main body 2.

Figure 27:
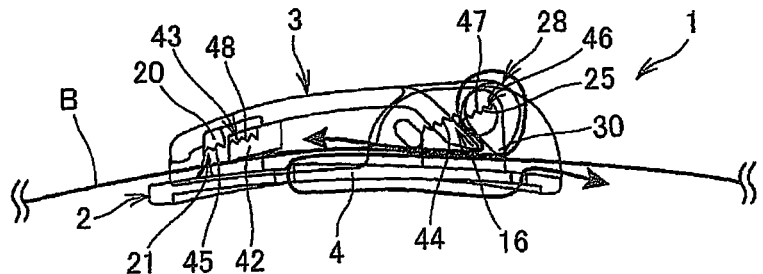
FIG. 27 is a cross-sectional view of a state in which when the rotary lever is at the closing position, a concavoconvex strip of the claw receiver starts to be engaged with a concavoconvex strip of the engagement claw of the main body, and a concavoconvex strip of the rotary shaft starts to be engaged with a concavoconvex strip of the bearing (Embodiment 2).

As shown in FIG. 27, when the rotary lever 3 in the state shown in FIG. 26 is moved in the direction approaching the bottom plate 4, the receiving surfaces 43, 43 of the claw receivers 42, 42 of the rotary lever 3 are abutted against the engagement surfaces 21, 21 of the engagement claws 20, 20 of the main body 2, whereby the concavoconvex strips 48, 48 of the claw receivers 42, 42 start to be engaged with the concavoconvex strips 45, 45 of the engagement claws 20, 20, and the abutment surfaces 46, 46 of the rotary shafts 25, 25 are abutted against the guide surfaces 16, 16 of the bearings 12, 12 of the main body 2, so that the concavoconvex strips 47, 47 of the rotary shafts 25, 25 start to be engaged with the concavoconvex strips 44, 44 of the bearings 12, 12.

Figure 28:
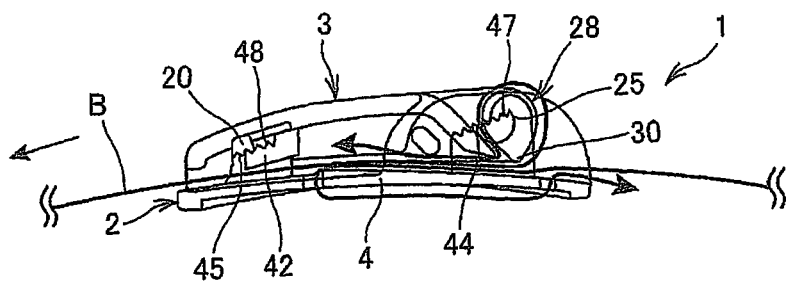
FIG. 28 is a cross-sectional view of a state in which when the rotary lever is in the closed state, the engagement between the concavoconvex strip of the claw receiver and the concavoconvex strip of the engagement claw of the main body progresses, and the engagement between the concavoconvex strip of the rotary shaft and the concavoconvex strip of the bearing progresses (Embodiment 2).

As shown in FIG. 28, when the rotary lever 3 in the state shown in FIG. 27 is moved in the direction in which the tensile force of the band B acts, the engagement between the concavoconvex strips 48, 48 of the claw receivers 42, 42 of the rotary lever 3 and the concavoconvex strips 45, 45 of the engagement claws 20, 20 of the main body 2 progresses, and the engagement between the concavoconvex strips 47, 47 of the rotary shaft 24 and the concavoconvex strips 44, 44 of the bearings 12, 12 progresses. At this time, the rotary lever 3 is moved in the direction in which the tensile force of the band B acts and the direction approaching the bottom plate 4 of the main body 2 by the abutment between the inclined receiving surfaces 43, 43 of the claw receivers 42, 42 and the inclined engagement surfaces 21, 21 of the engagement claws 20, 20 and the abutment between the inclined abutment surfaces 46, 46 of the rotary shafts 25, 25 and the inclined guide surfaces 16, 16 of the bearings 12, 12.

Figure 29:
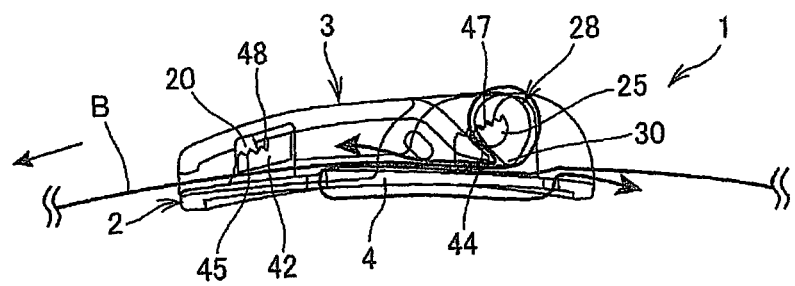
FIG. 29 is a cross-sectional view of a state in which when the rotary lever is in the closed state, the engagement between the concavoconvex strip of the claw receiver and the concavoconvex strip of the engagement claw of the main body further progresses, and the engagement between the concavoconvex strip of the rotary shaft and the concavoconvex strip of the bearing further progresses (Embodiment 2).

As shown in FIG. 29, when the rotary lever 3 whose engagement has been started is further moved in the direction in which the tensile force of the band B acts and the direction approaching the bottom plate 4, the engagement of the concavoconvex strips 48, 48 of the claw receives 42, 42 of the rotary lever 3 with the concavoconvex strips 45, 45 of the engagement claws 20, 20 of the main body 2 further progresses, and the engagement of the concavoconvex strips 47, 47 of the rotary shaft 24 with the concavoconvex strips 44, 44 of the bearings 12, 12 further progresses.

Figure 30:
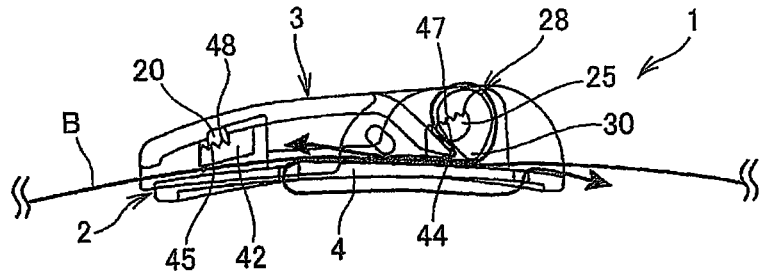
FIG. 30 is a cross-sectional view of a state in which when the rotary lever is in the closed state, the engagement between the concavoconvex strip of the claw receiver and the concavoconvex strip of the engagement claw of the main body is completed, and the engagement between the concavoconvex strip of the rotary shaft and the concavoconvex strip of the bearing is completed (Embodiment 2).

When the operation progresses in the band fastening tool 1, the engagement between the concavoconvex strips 48, 48 of the claw receivers 42, 42 of the rotary lever 3 and the concavoconvex strips 45, 45 of the engagement claws 20, 20 of the main body 2 is completed, and, at the same time, the engagement between the concavoconvex strips 47, 47 of the rotary shafts 25, 25 and the concavoconvex strips 44, 44 of the bearings 12, 12 is completed. As shown in FIG. 30, in the band fastening tool 1, when the engagement between the claw receivers 42, 42 and the engagement claws 20, 20 is completed, and when the engagement between the rotary shafts 25, 25 and the bearings 12, 12 is completed, the rotary lever 3 is in the closed state. The operation of approaching the rotary shaft 24 to the bottom plate 4 of the main body 2 increases the force of holding the band B between the bottom plate 4 of the main body 2 and the projecting portion 30 of the winding shaft 28, and the band B is fixed.

As described above, in the band fastening tool 1 of Embodiment 2, when the rotary lever 3 rotated to the closing position is moved in the direction in which the tensile force of the band B acts, the concavoconvex strips 48, 48 of the claw receivers 42, 42 of the rotary lever 3 are engaged with the concavoconvex surfaces 45, 45 of the engagement claws 20, 20 of the main body 2, and, at the same time, the concavoconvex strips 47, 47 of the rotary shafts 25, 25 are engaged with the concavoconvex strips 44, 42 of the bearings 12, 12, whereby the rotary lever 3 can be firmly maintained in the closed state against the tensile force of the band B regardless of impact and vibration from the outside and temporal deformation, and the rotary lever 3 can be prevented from being rotated to the opening position.

Further, in the band fastening tool 1 of Embodiment 2, since the concavoconvex strips 48, 48 of the claw receivers 42, 42 and the concavoconvex strips 45, 45 of the engagement claws 20, 20 engaged with each other and the concavoconvex strips 47, 47 of the rotary shafts 25, 25 and the concavoconvex strips 44, 44 of the bearings 12, 12 engaged with each other are concavoconvex strips extending in the direction perpendicular to the tensile force of the belt B, the engagement between the claw receivers 42, 42 and the engagement claws 20, 20 and the engagement between the rotary shafts 25, 25 and the bearings 12, 12 can be made rigid, the closed state of the rotary lever 3 can be firmly maintained, and the rotary lever 3 can be prevented from being rotated to the opening position.

In the band fastening tool 1 of Embodiment 2, as in the band fastening tool 1 of Embodiment 1, the anti-slip portion 9 of the locking hole 6 of the main body 2 and the anti-slip portion 35 of the insertion hole 33 of the rotary lever 2 are arranged in a curved manner so that in the width direction of the band B, the protruding length at the center is different from the protruding length on the both sides, whereby the anti-slip portions 9, 35 can be easily caught on the band B, slipping of the band B can be satisfactorily prevented, and fastening of the band B can be prevented from being loosened.

Furthermore, in the band fastening tool 1 of Embodiment 2, as in the band fastening tool 1 of Embodiment 1, the rotary lever 3 is provided with the guide wall 38 which guides the band B into the guide hole 39 so that the band B is folded at an acute angle along the front end portion 34 of the insertion hole wall 32, whereby the anti-slip portion 35 of the insertion hole 33 can be more easily caught inside the folded portion of the band B, slipping of the band B can be more satisfactorily prevented, and fastening of the band B can be more reliably prevented from being loosened.

INDUSTRIAL APPLICABILITY

This invention can be utilized as a band fastening tool for fastening and fixing various flexible bands such as a so-called telegraph pole band used, for example, when a cable, a conduit, a protective plate, or the like is fixed onto a circumferential surface of a telegraph pole and when a support bracket of an advertisement, a street light, or the like is attached onto the circumferential surface of the telegraph pole, and the invention can be utilized as a band used for binding cargo such as a metallic steel material and a band fastening tool utilized for lightweight packing.

REFERENCE SIGNS LIST 1 band fastening tool
2 main body
3 rotary lever
4 bottom plate
5 side plate
6 locking hole
7 locking hole
9 anti-slip portion
11 anti-slip portion
12 bearing
16 guide surface
17 protrusion
20 engagement claw
21 engagement surface
22 upper plate
23 front side plate
24 rear side plate
25 rotary shaft
26 cut-out
28 winding shaft
29 base shaft portion
30 projecting portion
31 anti-slip portion
32 insertion hole wall
33 insertion hole
34 front end portion
35 anti-slip portion
38 guide wall
39 guide hole
42 claw receiver
43 receiving surface

The invention claimed is:

1. A band fastening tool which comprises a main body having a bearing and a rotary lever having a rotary shaft rotatably engaged with the bearing of the main body, while one end of the band being inserted through a locking hole of the main body and locked, the other end of the band being inserted through an insertion hole of the rotary lever rotated to an opening position with respect to the main body, and the rotary lever being rotated to a closing position with respect to the main body to wind the band around the winding shaft of the rotary lever, and thus to hold the band between the main body and the rotary lever while fastening the band, whereby the band being fixed, wherein the bearing of the main body comprises a guide surface inclined to move the rotary shaft of the rotary lever in a direction in which a tensile force of the band acts and a direction approaching a bottom plate of the main body, the guide surface of the bearing comprises a protrusion extending in a direction perpendicular to the tensile force of the band, the rotary shaft comprises a cut-out engaged with the protrusion of the bearing in such a state that the rotary lever rotated to the closing position is moved in the direction in which the tensile force of the band acts and the direction approaching the bottom plate of the main body, the winding shaft of the rotary lever is formed into a cam shape having a base shaft portion which is spaced apart from the bottom plate of the main body and a projecting portion which protrudes from the base shaft portion to press the band onto the bottom plate of the main body in such a state that the rotary lever is rotated to the closing position, the rotary lever comprises, between the rotary lever and the winding shaft, an insertion hole wall for forming an insertion hole through which the band is inserted toward the projecting portion, an engagement claw comprising an engagement surface inclined in the direction in which the tensile force of the band acts and the direction approaching the bottom plate of the main body is provided on an upper surface of the bottom plate of the main body, a claw receiver comprising a receiving surface abutted against the engagement surface of the engagement claw is provided on a lower surface of an upper plate of the rotary lever, as the rotary lever in which the band is inserted through the insertion hole is rotated to the closing position, winding of the band along the base shaft portion of the winding shaft and fixing of the band between the bottom plate of the main body and the projecting portion of the winding shaft are promoted, when the receiving surface of the claw receiver of the rotary lever rotated to the closing position is abutted against the engagement surface of the engagement claw of the main body, and, at the same time, when the rotary lever is moved in the direction in which the tensile force of the band acts in such a state that the rotary shaft is abutted against the guide surface of the bearing, while the engagement between the claw receiver of the rotary lever and the engagement claw of the main body progresses, the rotary shaft moves along the guide surface of the bearing in the direction approaching the bottom plate of the main body to engage the cut-out with the protrusion of the bearing, and the band is fixed while being held between the bottom plate of the main body and the projecting portion of the winding shaft.

2. The band fastening tool according to claim 1, wherein in the locking hole of the main body, a concavoconvex-shaped anti-slip portion is disposed at a hole edge located inside a folded portion of the band so that in the width direction of the band, the protruding length at the center is different from the protruding length on the both sides, and in the insertion hole of the rotary lever, the concavoconvex-shaped anti-slip portion is disposed at a front end of the insertion hole wall located inside the folded portion of the band so that in the width direction of the band, the protruding length at the center is different from the protruding length on the both sides.

3. The band fastening tool according to claim 1, wherein the rotary lever comprises a guide wall which guides the band so that the band drawn from the insertion hole is folded at an acute angle along the front end of the insertion hole wall.

4. The band fastening tool according to claim 1, wherein since the engagement claw of the main body and the claw receiver of the rotary lever are covered by the upper plate of the rotary lever in a state of being engaged with each other.

5. The band fastening tool according to claim 1, wherein the guide surface of the bearing of the main body comprises a plurality of concavoconvex strips extending in a direction perpendicular to the tensile force of the band, the rotary shaft comprises an abutment surface abutted against the guide surface of the bearing in such a state that the rotary lever is rotated to the closing position, the abutment surface of the rotary shaft comprises a plurality of concavoconvex strips engaged with the concavoconvex strips of the bearing in such a state that the rotary lever is rotated to the closing position, the engagement surface of the engagement claw of the main body comprises a plurality of concavoconvex strips extending in the direction perpendicular to the tensile force of the band, and the receiving surface of the claw receiver of the rotary lever comprises a plurality of concavoconvex strips engaged with the concavoconvex strips of the engagement claw.

* * * * *